(12) United States Patent
Peli et al.

(10) Patent No.: US 9,523,853 B1
(45) Date of Patent: Dec. 20, 2016

(54) PROVIDING FOCUS ASSISTANCE TO USERS OF A HEAD MOUNTED DISPLAY

(71) Applicant: Google Inc., Mountain View, CA (US)

(72) Inventors: Eliezer Peli, Needham, MA (US); Anurag Gupta, San Jose, CA (US)

(73) Assignee: Google Inc., Mountain View, CA (US)

( * ) Notice: Subject to any disclaimer, the term of this patent is extended or adjusted under 35 U.S.C. 154(b) by 100 days.

(21) Appl. No.: 14/184,915

(22) Filed: Feb. 20, 2014

(51) Int. Cl.
*G09G 5/00* (2006.01)
*G06F 3/01* (2006.01)
*G02B 27/01* (2006.01)

(52) U.S. Cl.
CPC ................ *G02B 27/017* (2013.01)

(58) Field of Classification Search
CPC .......... G02B 27/017; G02B 27/0172; G02B 2027/0132; G02B 2027/0187; G02B 27/0176; G02C 7/00
USPC ............................................................ 345/8
See application file for complete search history.

(56) References Cited

U.S. PATENT DOCUMENTS

| 8,467,133 | B2 | 6/2013 | Miller | |
|---|---|---|---|---|
| 2004/0183751 | A1* | 9/2004 | Dempski | G02B 27/017 345/8 |
| 2008/0117289 | A1 | 5/2008 | Schowengerdt et al. | |
| 2012/0268588 | A1* | 10/2012 | Eckerl | G01M 11/0207 348/135 |
| 2013/0027668 | A1 | 1/2013 | Pamplona et al. | |
| 2013/0285885 | A1 | 10/2013 | Nowatzyk et al. | |
| 2013/0286053 | A1 | 10/2013 | Fleck et al. | |
| 2014/0362110 | A1* | 12/2014 | Stafford | G06F 3/013 345/633 |

OTHER PUBLICATIONS

Peli, E., "Chapter 6: Optometric and Perceptual Issues with Head-mounted Displays," In *Visual Instrumentation: Optical Design and Engineering Principles* by Mouroulis, P., Copyright © 1999 by The McGraw-Hill Companies, Inc., 74 pages, Retrieved from: http://serinet.meei.harvard.edu/faculty/peli/papers/Peli_Chapter%206_OptometricPercept_1999.pdf.

* cited by examiner

*Primary Examiner* — Lixi C Simpson
*Assistant Examiner* — Ngan T Pham Lu
(74) *Attorney, Agent, or Firm* — Blakely Sokoloff Taylor & Zafman LLP (57) ABSTRACT

A head mounted display ("HMD") includes a display module that displays a primary viewing image at a focus distance. The display module also displays a focusing cue image at the focus distance to aid a user of the HMD in focusing on the primary viewing image at the focus distance.

16 Claims, 6 Drawing Sheets

PROVIDING FOCUS ASSISTANCE TO USERS OF A HEAD MOUNTED DISPLAY

TECHNICAL FIELD

This disclosure relates generally to optics, and in particular but not exclusively, relates to providing focus assistance to users of a head mounted display.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality, the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. In at least some applications of HMDs, users change their eyes' focus between real-world images and images displayed/projected by an HMD. In other contexts, the user will focus on the image(s) displayed by the HMD for an extended period of time. Thus, assisting a user in focusing on the image(s) displayed by the HMD may enhance a user's viewing experience.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for providing focus assistance to a user of a head mounted display are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
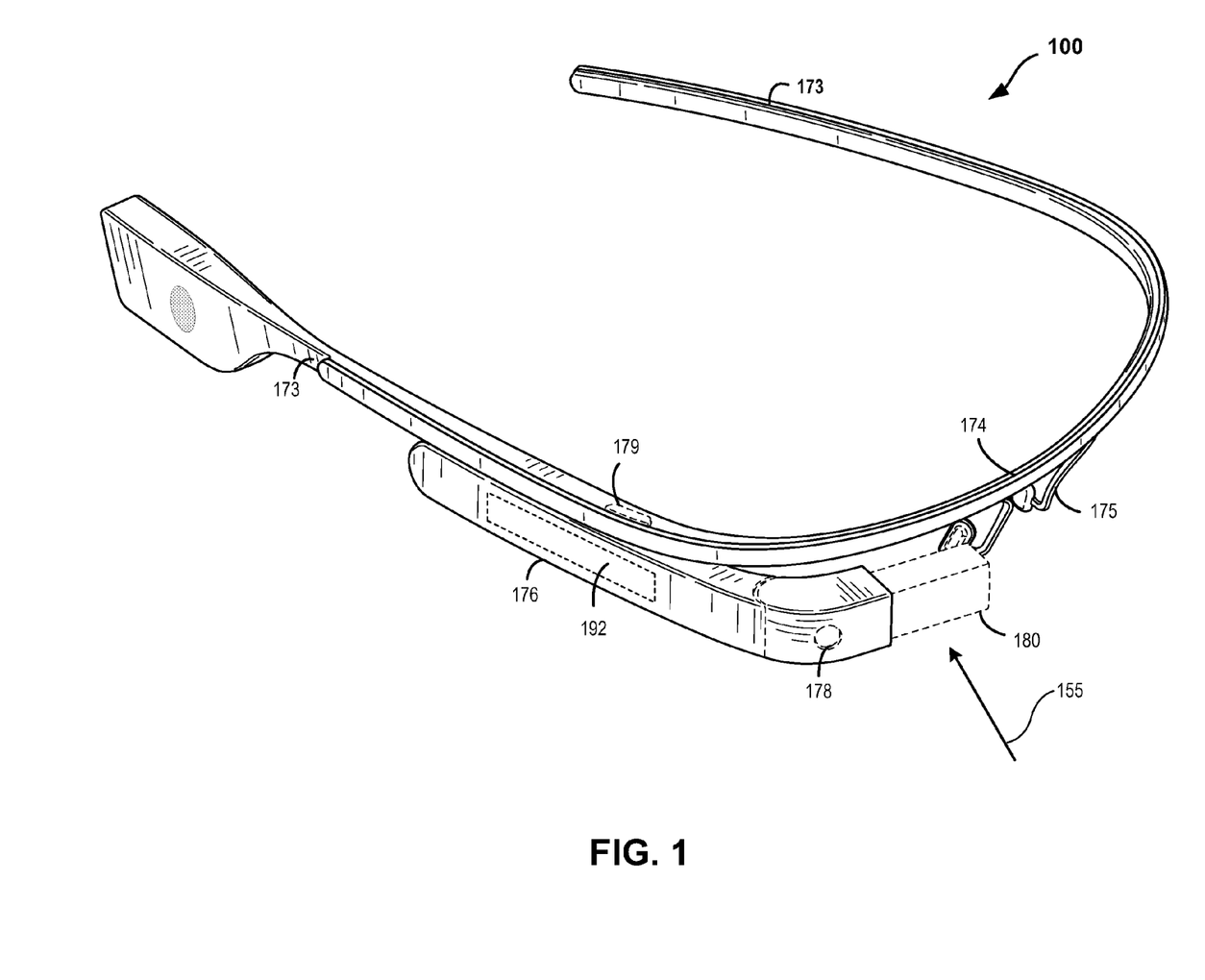
FIG. 1 illustrates an example monocular see-through head mounted display ("HMD"), in accordance with an embodiment of the disclosure.

FIG. 1 illustrates an example of a head mounted display ("HMD") 100, in accordance with an embodiment of the disclosure. An HMD is a display device worn on or about the head. Although FIG. 1 illustrates a specific monocular HMD 100, embodiments of the present invention are applicable to a wide variety of frame types and styles (e.g. visor, headband, goggles). HMD 100 includes side-arms 173, a center frame support 174, and a bridge portion with nosepiece 175. In the example embodiment shown in FIG. 1, center frame support 174 connects the side-arms 173.

The illustrated embodiment of HMD 100 is capable of displaying an augmented reality to the user. Eyepiece 180 may permit the user to see a real world image via external scene light 155 in additional to display light (having computer generated images) generated by a display module of the HMD. As a result, the display light may be seen by the user as a virtual image superimposed over the real world as an augmented reality.

HMD 100 may additionally include a component housing 176, which may include an on-board computing system (not shown). Button 179 may be used to operate a forward facing camera 178 and/or be usable for other input purposes. Touch-interface 192 may also be used as an input for user interaction with logic circuitry within component housing 176. Component housing 176 may also include other electrical components and/or may be electrically connected to electrical components at other locations within or on HMD 100. Component housing 176 may include light sources (not shown) for a display module that sends computer generated image light toward eyepiece 180 and/or optical elements (not shown) to direct light from the light sources to the eyepiece 180. As such, eyepiece 180 may include optical features that direct light that is generated by such light sources towards the wearer's eye, when HMD 100 is being worn.

When users wear an HMD (e.g. HMD 100) they may change their focus between real-world images and images displayed/projected by an HMD. The user may also focus on the image(s) displayed by the HMD for an extended period of time. In one embodiment, HMD 100 displays its virtual image at a virtual distance of 2.5 m. However, it has been observed that at least a small minority of users perceive the virtual image to be closer than 2.5 m. Perceiving the virtual image as closer than 2.5 m may increase the time and/or effort that a user requires to transition between real-world images and the virtual image. This effect may be associated with "proximal accommodation" or "instrument myopia" which are psychological/physiological effects caused by perceiving a virtual image at a closer distance than its virtual distance. Instrument myopia results in over-accommodation of the eye lens. In other words, the eye over-focuses to a distance that is closer than the virtual distance of the virtual image.

Figure 2:
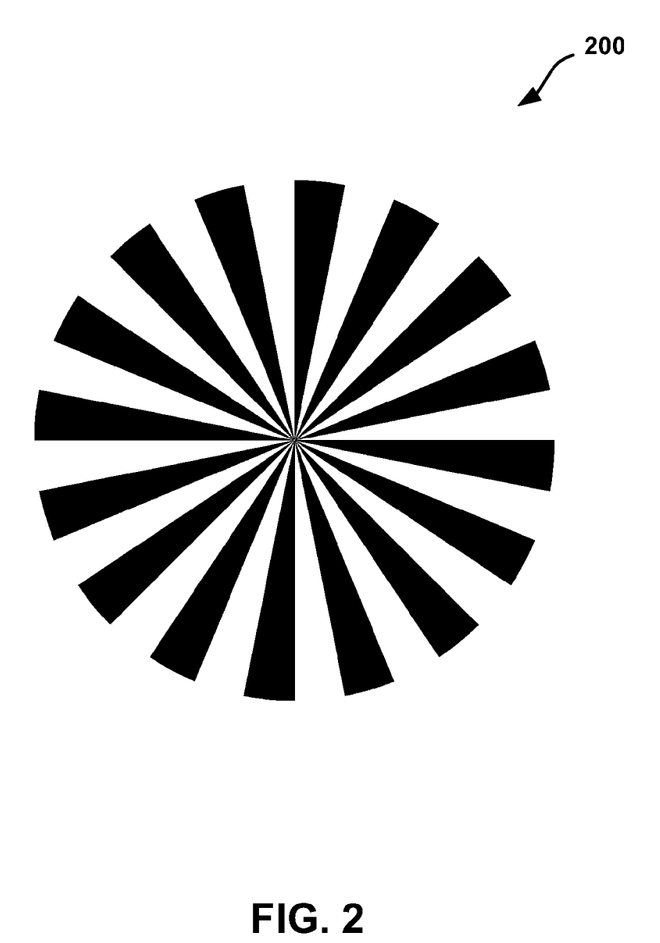
FIG. 2 illustrates an example focusing cue image for displaying to a user of an HMD, in accordance with an embodiment of the disclosure.

FIG. 2 illustrates an example focusing cue image 200 for displaying to a user of an HMD, in accordance with an embodiment of the disclosure. Focusing cue image 200 is a Siemens Star that has phase reversal properties. Siemens stars are used to adjust focus on projectors, for example. For the purposes of this disclosure, a focusing cue image that has phase reversal properties is a focusing cue image that provides a phase reversal when it is viewed out of focus. Phase reversal in the Siemens Star may manifest as the white spokes and the black spokes of the Siemens Star appearing to alternate (i.e. the white spokes appearing where the black spokes belong and the black spokes appearing where the white spokes belong) in at least a portion of the Siemens Star. The phase reversal phenomenon may only appear at a certain radius away from the center of the Siemens Star for a given amount of optical lens blur.

Figure 3:
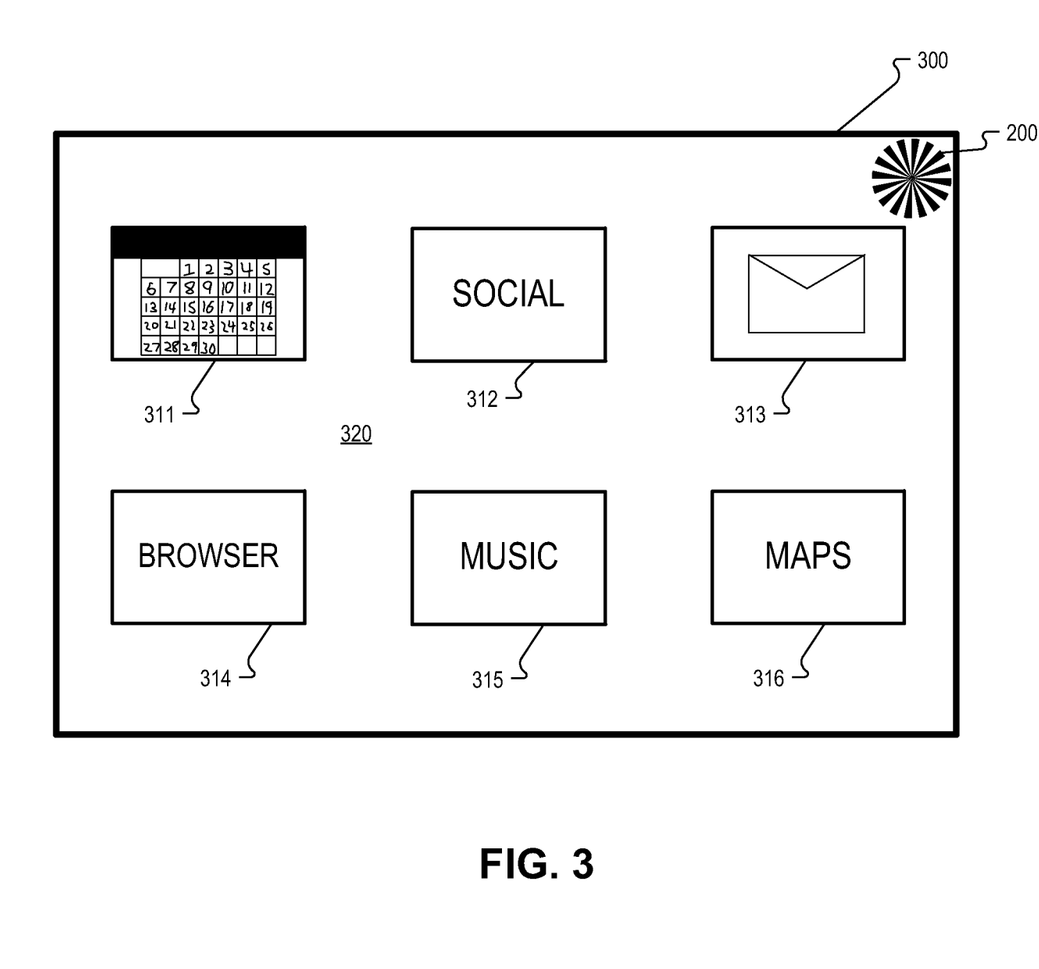
FIG. 3 illustrates an example home-screen image that includes an example focusing cue image for displaying to a user of an HMD, in accordance with an embodiment of the disclosure.

FIG. 3 illustrates an example home-screen image 300 that includes example focusing cue image 200, in accordance with an embodiment of the disclosure. Home-screen image 300 is an example of a virtual image that may be presented to a user of HMD 100. Home-screen image 300 is the primary viewing image that the user is supposed to perceive and focus on. Focusing cue image 200 is displayed along an outside edge of home-screen image 300 in FIG. 3. More specifically, in FIG. 3, focusing cue image 200 is displayed in a corner of the home-screen image 300. In other embodiments, a focusing cue image may be positioned in other locations of a primary viewing image. FIG. 3 shows HMD 100 operating in a persistent mode where the focusing cue image 200 and primary viewing image (home-screen 300) are displayed simultaneously.

Home-screen image 300 includes icons 311-316 displayed over a background 320. Icon 311 is an icon for a calendar application, icon 312 is an icon for a social media application, icon 313 is an icon for an email application, icon 314 is an icon for an internet browser, icon 315 is an icon for a music player, and icon 316 is an icon for a navigation application. Of course, the illustrated icons are just examples of possible icons on a home-screen 300.

Home-screen image 300 is just one example of a primary viewing image. Other primary viewing images may include pictures, videos, an image of an internet browser, or otherwise. The primary viewing image is the content displayed by the HMD that is the intended image for the user to view and focus on. The focusing cue image is intended to aid the user in focusing on the primary viewing image and mitigate or eliminate the effects associated with instrument myopia. The focusing cue image is displayed at approximately the same focus distance as the primary viewing image so that the user can first focus on the focusing cue image and then easily transition to focusing on the primary viewing image at the same focus distance. This will assist in centering the eye's focus at the appropriate focus distance to focus on the primary viewing image. Assisting the eye's focusing for viewing the primary viewing image may enhance a viewer's experience by reducing time, effort, and any eye fatigue associated with focusing on a virtual image.

Phase reversal properties in a focusing cue image (e.g. focusing cue image 200) may be advantageous when compared to simple blur/softening image sharpness cues. Displays in HMDs often have a small exit pupil and a corresponding wide depth of focus. Therefore, simple blur softening image sharpness cues may provide limited blur feedback to the eye of the user. In contrast, focusing cue images that provide a phase reversal when they are out of focus may prove more useful to a user in order to focus their eye at the appropriate focus distance because the phase reversal phenomenon will be easier to note even with a small exit pupil of the display of the HMD that tends to reduce the blur effect. The use of phase reversals increases the user's sensitivity to blur countering the sharpening effect of the small pupil. Of course, other focusing cue images besides focusing cue image 200 may be used. Other patterns used to adjust optical instruments and electronic instruments for instrument quality may be used.

Figure 4A:
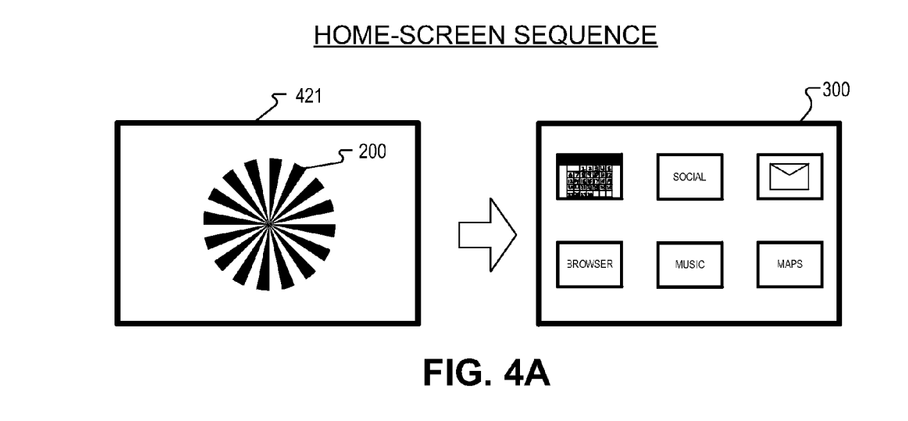
FIGS. 4A and 4B illustrate example image display sequences that include a focusing cue image, in accordance with an embodiment of the disclosure.

FIG. 4A shows a home-screen sequence that includes displaying focusing cue image 200 prior to displaying home-screen 300, in accordance with an embodiment of the disclosure. In one embodiment, focusing cue image 200 is displayed for a small period of time (e.g. 0.5 second) prior to the HMD displaying home-screen 300. In one embodiment, focusing cue image 200 is only displayed for a short period of time prior to displaying home-screen 300 upon an initialization (e.g. power-on or wake from sleep mode) of HMD 100.

Figure 4B:
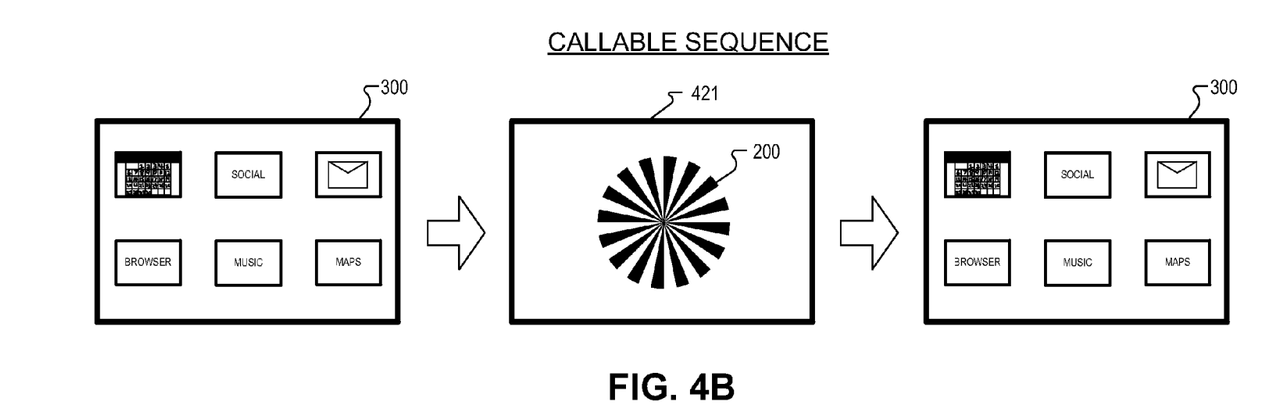

FIG. 4B shows a callable sequence that includes displaying focusing cue image 200 in response to a user input, in accordance with an embodiment of the disclosure. A user of HMD 100 may be viewing a primary viewing image or images (e.g. video or image content such as home-screen 300) when the user realizes she could use assistance in focusing on the primary viewing image. The user can then indicate to HMD 100 via a user input that she would like to call up a focusing cue image to assist her in focusing on the primary viewing image(s). In the illustrated example, home-screen 300 is the primary viewing image and frame 421 that includes focusing cue image 200 is displayed for the user when the user calls for the focusing cue image assistance via a user input. In one embodiment, frame 421 is displayed for a short period of time (e.g. 0.5 seconds) and then HMD 100 automatically reverts back to the primary viewing image, which is home-screen 300 in FIG. 4B. In one embodiment, frame 421 is displayed until the user HMD 100 calls for the primary viewing image to be displayed. In another embodiment, focusing cue image 200 is displayed (simultaneously with the primary viewing image) in the corner of the primary viewing image (similarly to FIG. 2) in response to a user input. The user can call for the primary viewing image to be displayed by a variety of user inputs.

Figure 6:
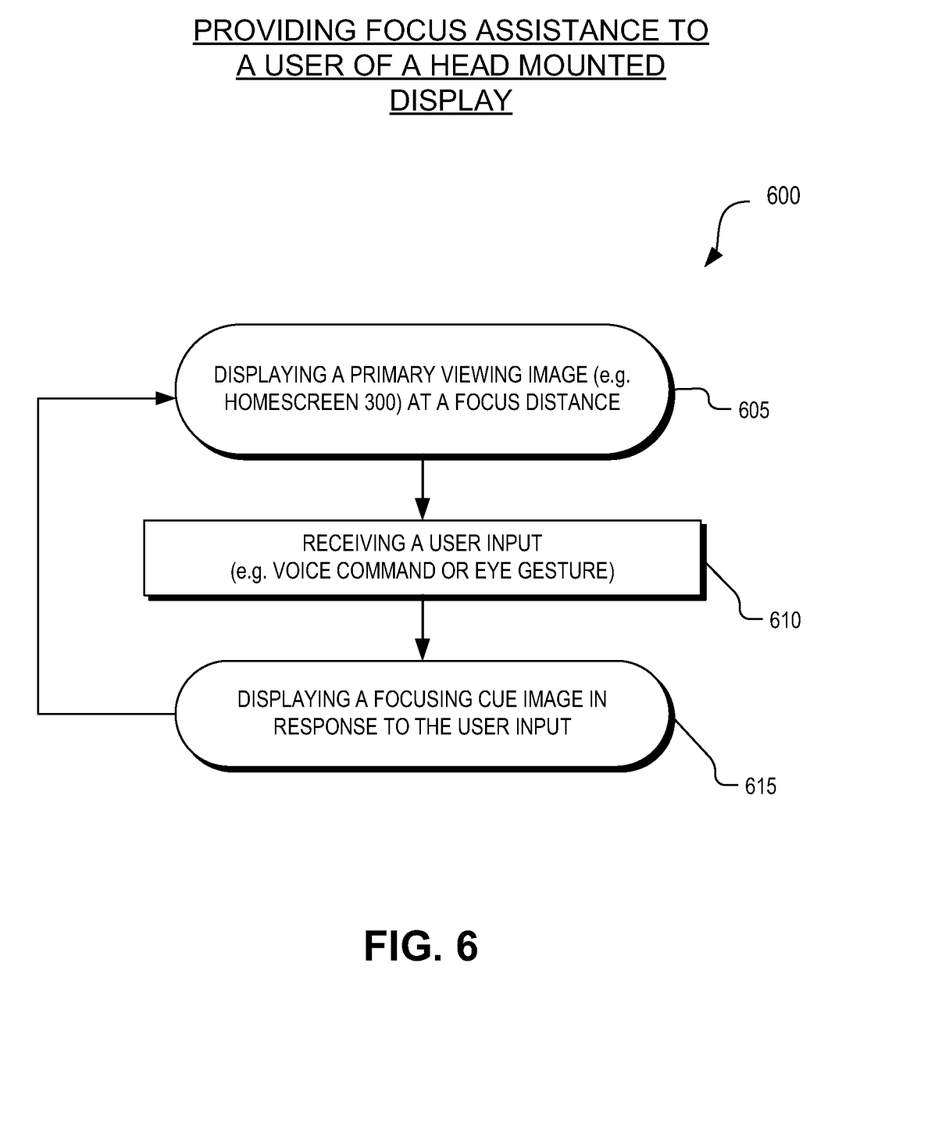
FIG. 6 is a flow chart illustrating a process of providing focus assistance to a user of an HMD, in accordance with an embodiment of the disclosure.

FIG. 6 is a flow chart illustrating an example process 600 of providing focus assistance to a user of an HMD, in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

In process block 605, a primary viewing image (e.g. home-screen 300) is displayed by a display module of HMD 100 at a given focus distance (e.g. 2.5 m). If HMD 100 receives a certain user input (process block 610), it will display a focusing cue image in response to the user input (process block 615). Process 600 may then return to process block 605. The user input in process block 610 may take a variety of forms including voice commands, touch-interface interactions, and/or eye-gestures.

Figure 5:
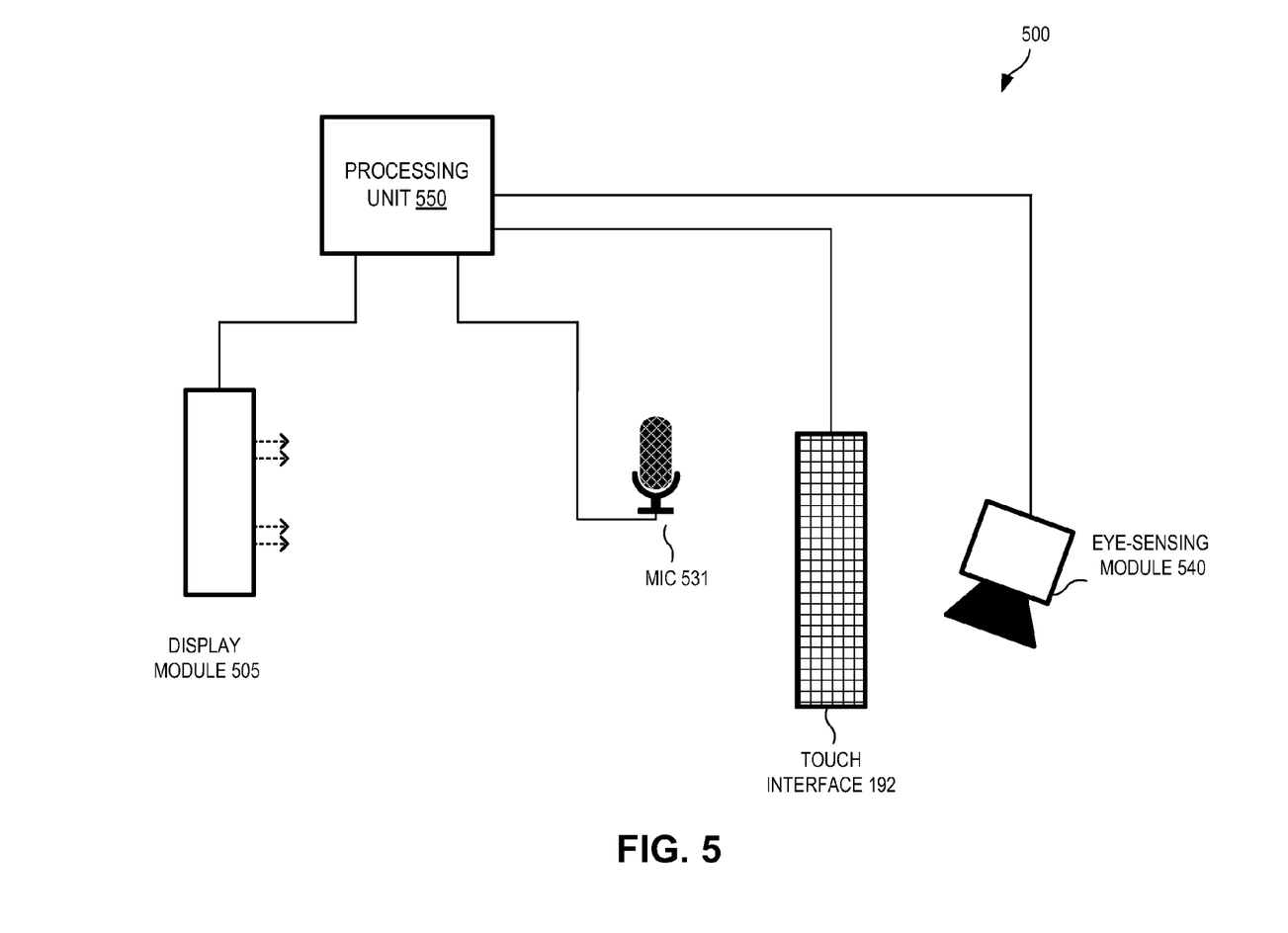
FIG. 5 illustrates an example system that may be incorporated into a HMD, in accordance with an embodiment of the disclosure.

FIG. 5 illustrates a block diagram schematic of an example system 500 that may be incorporated into HMD 100 to facilitate receiving and processing various user inputs, in accordance with an embodiment of the disclosure. System 500 includes processing unit 550, display module 505, and optionally includes microphone 531, touch interface 192, and/or eye-sensing module 540. In the illustrated embodiment, processing unit 550 is coupled to control display module 505 which projects the virtual images into eyepiece 180 for viewing by a user of HMD 100. Processing unit 550 may include logic circuitry such as a processor, a field-programmable gate array ("FPGA"), or otherwise. Processing unit 550 may also include a memory coupled to a processor. The memory may store images, user settings, and firmware/software that can be accessed and executed by the processor, for example.

Processing unit 550 is coupled to receive audio signals from microphone 531, in FIG. 5. Microphone 531 may be mounted within component housing 176. In operation, a user of HMD 100 may call out a voice command (e.g. "OK glass, focusing cue") that is received by microphone 531, which generates an audio signal. After analyzing the audio signal from microphone 531, processing unit 550 may then cause display module 505 to display frame 421 (including focusing cue image 200) to assist the user in focusing.

Processing unit 550 is also coupled to receive touch signals from touch interface 192 in FIG. 5. In operation, a user of HMD 100 may touch touch-interface 192 with their finger, which generates touch signals. After analyzing the touch signals from touch-interface 192, processing unit 550 may then cause display module 505 to display frame 421 (including focusing cue image 200) to assist the user in focusing.

Also in the illustrated embodiment, processing unit 550 is coupled to receive eye-sensing data from eye-sensing module 540. Eye-sensing module 540 may include an image sensor that is positioned to capture real-time digital images of an eye of a user of HMD 100. Light bending optics may be used to deliver an eye image to a peripherally located camera sensor of eye-sensing module 540. Eye-sensing module 540 may image an eye of a user and report eye-sensing data to processing unit 550. In operation, a user of HMD 100 may perform an eye-gesture (e.g. moving eye in a specific pattern). Eye-sensing module 540 may capture the eye gesture in a series of images and send the series of images to processing unit 550 as eye-sensing data. Processing unit 550 will then analyze the eye-sensing data to determine if a given eye-gesture was performed by a user. If the specific eye-gesture was performed, processing unit 550 may then cause display module 505 to display frame 421 (including focusing cue image 200) to assist the user in focusing.

In situations in which the systems discussed here record personal information about users, or may make use of personal information, the users may be provided with an opportunity to control whether programs or features collect or utilize user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of providing focus assistance to a user of a head mounted display ("HMD"), the method comprising:
    displaying a primary viewing image to a user of the HMD at a focus distance, wherein the primary viewing image is generated by a display module of the HMD and displayed to the user in a see-through eyepiece, wherein the user sees the primary viewing image superimposed on a real world image, and wherein the real world image is viewable through the see-through eyepiece; and
    displaying a focusing cue image exhibiting phase reversal to the user of the HMD at the focus distance to aid the user in focusing on the primary viewing image at the focus distance and mitigate instrument myopia and over accommodation of a crystalline lens in an eye of the user, wherein displaying the focusing cue image is in response to input from the user.

2. The method of claim 1, wherein the focusing cue image includes a Siemen star pattern.

3. The method of claim 1, wherein the focusing cue image is generated by the display module of the HMD.

4. The method of claim 1, wherein the focusing cue image is displayed along an outside edge of the primary viewing image.

5. The method of claim 1, wherein the focusing cue image is displayed in a corner of the primary viewing image.

6. The method of claim 1, wherein the input from the user is a voice command, and wherein the voice command is received by a microphone of the HMD.

7. The method of claim 1, wherein the input from the user is an eye-gesture, and wherein the eye-gesture is captured by an eye-sensing module of the HMD.

8. The method of claim 1, wherein the primary viewing image is a home-screen, and wherein the focusing cue image is displayed immediately prior to displaying the home-screen.

9. A head mounted display ("HMD") comprising:
 a display module coupled to a see-through eyepiece to launch display light in an eyeward direction;
 a processing unit coupled to the display module for controlling the display module; and
 a non-transitory machine-accessible storage medium that provides instructions that, when executed by the HMD, will cause the HMD to perform operations comprising:
  displaying a primary viewing image at a focus distance, wherein the primary viewing image is generated by the display module of the HMD for viewing in the see-through eyepiece, wherein the primary viewing image is superimposed over a real world image incident through the see-through eyepiece; and
  displaying a focusing cue image exhibiting phase reversal at the focus distance to aid a user of the HMD in focusing on the primary viewing image at the focus distance and mitigate instrument myopia and over accommodation of a crystalline lens in an eye of the user, wherein displaying the focusing cue image is in response to input from the user.

10. The HMD of claim 9, wherein the focusing cue image includes a Siemen star pattern.

11. The HMD of claim 9, wherein the focusing cue image is generated by the display module.

12. The HMD of claim 9, wherein the focusing cue image is displayed along an outside edge of the primary viewing image.

13. The HMD of claim 9, wherein the focusing cue image is displayed in a corner of the primary viewing image.

14. The HMD of claim 9 further comprising a microphone for receiving the input from the user, wherein the processing unit is coupled to receive the input from the user from the microphone.

15. The HMD of claim 9 further comprising an eye-sensing module for capturing eye-gestures from a wearer of the HMD, wherein the input from the user is an eye-gesture, and wherein the processing unit is coupled to receive the input from the user from the eye-sensing module.

16. The HMD of claim 9, wherein the primary viewing image is a home-screen, and wherein the focusing cue image is displayed immediately prior to displaying the home-screen.

* * * * *